(12) United States Patent
Brännlund et al.

(10) Patent No.: US 10,149,328 B2
(45) Date of Patent: Dec. 4, 2018

(54) RADIO NETWORK CONTROLLER AND A METHOD THEREIN FOR MANAGING A RANDOM ACCESS CHANNEL

(71) Applicant: TELEFONAKTIEBOLAGET LM ERICSSON (PUBL), Stockholm (SE)

(72) Inventors: Tomas Brännlund, Sigtuna (SE); Babak Alamshahi, Järfälla (SE); Linda Brus, Vällingby (SE); Mikael Söderström, Vallentuna (SE); Martin Skarve, Enebyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 115 days.

(21) Appl. No.: 15/112,329

(22) PCT Filed: Jan. 28, 2014

(86) PCT No.: PCT/EP2014/051586
§ 371 (c)(1),
(2) Date: Jul. 18, 2016

(87) PCT Pub. No.: WO2015/113588
PCT Pub. Date: Aug. 6, 2015

(65) Prior Publication Data
US 2016/0345366 A1    Nov. 24, 2016

(51) Int. Cl.
*H04W 74/08* (2009.01)
*H04W 76/27* (2018.01)
(Continued)

(52) U.S. Cl.
CPC ..... *H04W 74/0866* (2013.01); *H04W 74/006* (2013.01); *H04W 74/08* (2013.01); *H04W 76/27* (2018.02); *H04W 88/02* (2013.01)

(58) Field of Classification Search
CPC ............. H04W 74/0866; H04W 76/27; H04W 74/006; H04W 74/08; H04W 88/02
See application file for complete search history.

(56) References Cited

U.S. PATENT DOCUMENTS

| | | | | |
|---|---|---|---|---|
| 2005/0141471 A1* | 6/2005 | Virtanen | ................. | H04L 45/00 370/342 |
| 2006/0142020 A1* | 6/2006 | Mueckenheim | .. | H04W 72/0486 455/453 |

(Continued)

FOREIGN PATENT DOCUMENTS

| | | |
|---|---|---|
| EP | 1331767 A1 | 7/2003 |
| EP | 1677563 A1 | 7/2006 |

(Continued)

OTHER PUBLICATIONS

3GPP TSG RAN WG2 #15, RLC timer start criteria, R2-001635, Sophia Antipolis, France, Aug. 21-25, 2000.

*Primary Examiner* — Ajay Cattungal
(74) *Attorney, Agent, or Firm* — Baker Botts, LLP (57) ABSTRACT

A Radio Network Controller, RNC, and a method performed by the RNC for managing the utilization of a RACH of a WCDMA communication network wherein the RNC is associated with an RBS, wherein the RACH is an uplink channel between UEs and the RBS are provided. The method comprises determining a current resource utilization level of the RACH; setting, based on the determined resource utilization, a value of at least one Radio Link Control, RLC, parameter that controls the disposition of a UE to transmit data on the RACH; and employing the at least one RLC parameter to at least one UE being in a Cell Forward Access Channel, CELL_FACH, state or entering into the CELL_FACH state.

17 Claims, 3 Drawing Sheets

(51) Int. Cl.
*H04W 74/00* (2009.01)
*H04W 88/02* (2009.01)

(56) References Cited

U.S. PATENT DOCUMENTS

| | | | |
|---|---|---|---|
| 2010/0054139 A1 | 3/2010 | Chun et al. | |
| 2013/0028069 A1* | 1/2013 | Pelletier | H04W 72/0453 370/216 |
| 2013/0235777 A1* | 9/2013 | Takaki | H04W 52/0209 370/311 |
| 2013/0265925 A1* | 10/2013 | Tadaki | H04W 52/0225 370/311 |
| 2014/0051415 A1* | 2/2014 | Ekici | H04W 76/27 455/418 |
| 2014/0051454 A1* | 2/2014 | Wirtanen | H04W 76/046 455/452.1 |
| 2014/0140253 A1* | 5/2014 | Lohmar | H04L 65/4084 370/311 |
| 2015/0139187 A1* | 5/2015 | Arunachalam | H04W 36/24 370/331 |

FOREIGN PATENT DOCUMENTS

| | | |
|---|---|---|
| EP | 2086263 A1 | 8/2009 |
| WO | 2008014708 A1 | 2/2008 |
| WO | 2008038872 | 4/2008 |
| WO | 2013115698 A1 | 8/2013 |

* cited by examiner

RADIO NETWORK CONTROLLER AND A METHOD THEREIN FOR MANAGING A RANDOM ACCESS CHANNEL

This application is a 371 of International Application No. PCT/EP2014/051586, filed Jan. 28, 2014, the disclosure of which is fully incorporated herein by reference.

TECHNICAL FIELD

The present disclosure relates to wireless communication networks and in particular to managing the utilisation of a Random Access Channel, RACH, of a Wideband Code Division Multiple Access, WCDMA, communication network

BACKGROUND

In wireless communication networks, users may move about geographically freely, at least within the coverage area of the wireless communication network. There are different types of so-called generations of communication networks, e.g. 2G, 3G and 4G. These different generations employ different techniques, e.g. 2G wireless communication networks are also called Global System for Mobile Communications, GSM, is based on Time Division Multiple Access, TDMA; 3G wireless communication networks are also called Universal Mobile Telecommunications System, UMTS, is based on Wideband Code Division Multiple Access, WCDMA; and 4g wireless communication networks are also called Long Term Evolution, LTE, is based on Orthogonal Frequency Division Multiplex, OFDM. These different wireless communication systems have both similarities and differences.

In 3G or WCDMA wireless communication systems, hereinafter referred to as WCDMA systems or WCDMA networks, mobile stations or User Equipments, UEs, may be in different operation modes depending on whether the UE is camping on a cell or is actively engaged in a service offered by the CDMA network. A cell is a coverage area of a Radio Base Station, RBS, and by camping on a cell means that the UE is connected to the RBS having the cell as its coverage area and wherein the UE is idle, i.e. not engaged in a service.

A UE may enter a cell and thus becoming connected to the RBS either currently being active or engaged in a service, e.g. a phone call, or as being switched on but not in active use by the user of the UE. When in the cell, or when connected to the RBS, the user may determine to start using a service, e.g. making a phone call or looking at an Internet site. Depending on which "stage of activity" the UE is in, the UE is in different so-called Radio Resource Control, RCC, states. In WCDMA there are several different states, e.g. IDLE, URA_PCH, CELL_PCH and CELL_FACH. URA is short for Utran Registration Area and PCH is short for Paging Channel, wherein Utran is short for UMTS Terrestrial Radio Access Network. FACH is short for Forward Access Channel.

Depending on which RRC state the UE is in, the UE may use different uplink and downlink channels. In IDLE, URA_PCH, CELL_PCH, and CELL_FACH state, the channel used in the uplink is the Random Access CHannel, RACH, however, E-DCH possible from $3^{rd}$ Partnership Project, 3GPP, Release 8. The RACH channel is used for signalling in all four RRC states mentioned above and also for transmitting data in uplink in CELL_FACH state.

As with all channels, the capacity of RACH is not infinite. The RACH channel has several limitations. There is a limited number of access slots available for preambles. In addition there is a fixed number of preamble signatures. If more than one UE (randomly) chooses a specific preamble signature for transmission in a particular slot there will be a collision. RACH decoding possibilities in the RBS (decoding of both the preamble itself and of the RACH message that follows the preamble) might be a further limitation. When any one of these or other possible limitations is reached, the quality of the RACH channel deteriorates leading to higher latency and higher Block Error Rate, BLER.

SUMMARY

The object is to obviate at least some of the problems outlined above. In particular, it is an object to provide a Radio Network Controller, RNC, and a method performed by the RNC for managing the utilisation of a RACH of a WCDMA communication network wherein the RNC is associated with an RBS, wherein the RACH is an uplink channel between UEs and the RBS. These objects and others may be obtained by providing an RNC and a method performed by an RNC according to the independent claims attached below.

According to an aspect, a method performed by an RNC for managing the utilisation of a RACH of a WCDMA communication network wherein the RNC is associated with an RBS, wherein the RACH is an uplink channel between UEs and the RBS is provided. The method comprises determining a current resource utilisation level of the RACH; setting, based on the determined resource utilisation, a value of at least one Radio Link Control, RLC, parameter that controls the disposition of a UE to transmit data on the RACH; and employing the at least one RLC parameter to at least one UE being in a Cell Forward Access Channel, CELL_FACH, state or entering into the CELL_FACH state.

According to an aspect, an RNC adapted for managing the utilisation of a RACH of a WCDMA communication network, the RNC being associated with an RBS, wherein the RACH is an uplink channel between UEs and the RBS is provided. The RNC comprises a processor and a memory, the memory comprises instructions which when executed by the processor causes the RNC to determine a current resource utilisation level of the RACH; to set, based on the determined resource utilisation, a value of at least one RLC parameter that controls the disposition of a UE to transmit data on the RACH; and to employ the at least one RLC parameter to at least one UE being in a CELL_FACH state or entering_into the CELL_FACH state.

The method performed by the RNC and the RNC may have several advantages. One possible advantage is that by dynamically setting (or changing) the RLC parameters, a possible deterioration of the random access channel may be prevented in high load scenarios, while allowing for high performance in low load scenarios. Since the RACH is sensitive to high load and a well-functioning random access that can handle signalling from UEs to the network is a key component in e.g. ensuring emergency and speech accessibility, it is important that the quality of the RACH is not allowed to deteriorate as the number of UEs in the network (or being connected to the RBS) increases. Meanwhile, the end-user experience for UEs in CELL_FACH state is dependent on the network allowing for as much data transmission as possible on the RACH without creating problems.

BRIEF DESCRIPTION OF DRAWINGS

Embodiments will now be described in more detail in relation to the accompanying drawings, in which.

DETAILED DESCRIPTION

Briefly described, an RNC and a method performed by an RNC for managing the utilisation of a RACH of a WCDMA communication network are provided. The RNC is associated with an RBS, wherein the RACH is an uplink channel between UEs and the RBS. There may be more than one RACH per RBS and there may be more than one RBS per RNC. Hence, the RNC may manage a plurality of RACHs. The method described herein is performed per RACH, wherein the RNC monitors a utilisation of the RACH and steers the behaviour of either the UEs, the RNC itself or both in order to avoid the RACH becoming overloaded and thus risking the quality of the RACH channel deteriorating.

The method performed by the RNC for managing the utilisation of a RACH of a WCDMA communication network will now be described with reference to FIG. 1. The RNC is associated with an RBS, wherein the RACH is an uplink channel between UEs and the RBS.

Figure 1:
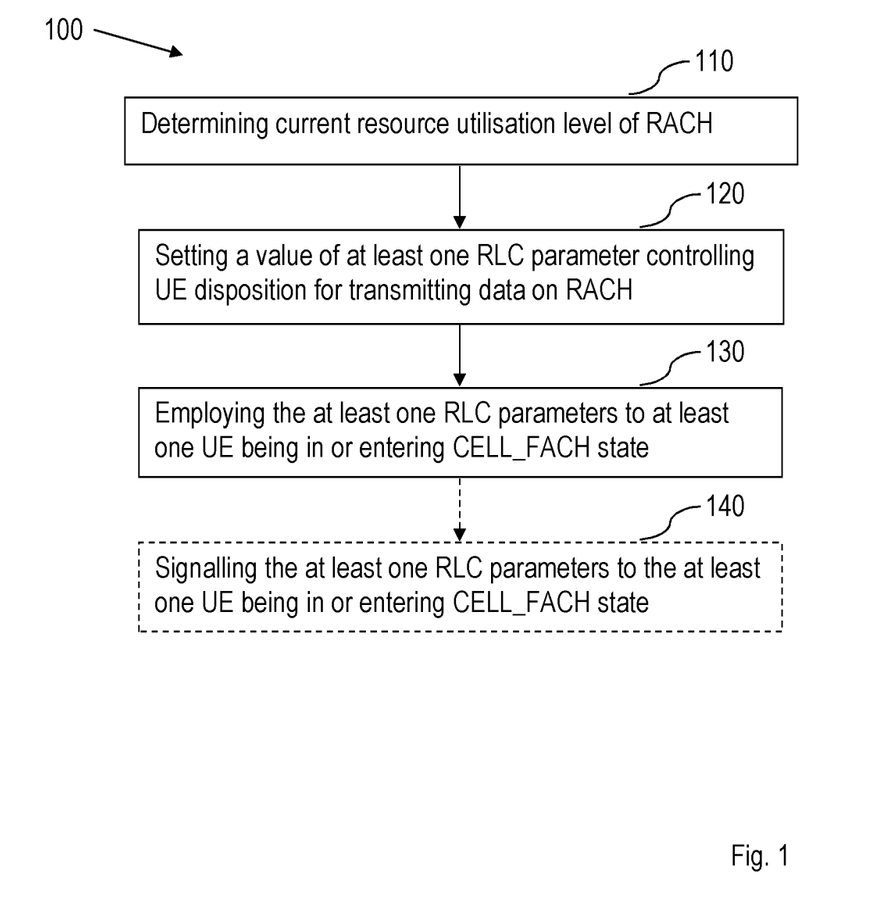
FIG. 1 is a flowchart of a method performed by a Radio Network Controller, RNC, for managing the utilisation of a RACH of a WCDMA communication network according to an exemplifying embodiment.

FIG. 1 illustrates the method comprising determining 110 a current resource utilisation level of the RACH; setting 120, based on the determined resource utilisation, a value of at least one Radio Link Control, RLC, parameter that controls the disposition of a UE to transmit data on the RACH; and employing 130 the at least one RLC parameter to at least one UE being in a Cell Forward Access Channel, CELL_FACH, state or entering into the CELL_FACH state.

The RNC may be associated with a plurality of RBSs and hence also a plurality of RACHs. It shall be pointed out that the method described is performed per RACH. The RNC monitors the resource utilisation level of the RACH. As described above, all UEs in RRC states IDLE, URA_PCH, CELL_PCH, and CELL_FACH may send signalling to the RBS by means of the RACH and UEs being in CELL_FACH may further transmit data on the RACH. Hence, there may be a mix of signalling and data being sent on the RACH from the UEs to the RBS. How the RNC monitors the RACH will be described in more detail below.

On RACH each UE transmits independently of other UEs; whenever a UE has signalling or data it wants to transmit, it does so without any system coordination. In a scenario with many users in CELL_FACH state, the amount of user data traffic can be much greater than the amount of signalling. In case any of the RACH limitations are reached, there is a risk that signalling on the RACH channel is negatively affected, with increased latency and high BLER as consequences.

Either continuously, regularly, randomly or by receiving a request therefore, the RNC determines the current resource utilisation level of the RACH. The current resource utilisation level of the RACH may be expressed e.g. as a percentage out of available (100%) resources of the RACH and it provides an indication to the RNC of how much of the available resources of the RACH that are currently being used by the UEs being connected to the RBS. Based on the determined resource utilisation, the RNC sets the value of at least one RLC parameter that controls the disposition of a UE to transmit data on the RACH. There are several RLC parameters as will be explained in more detail below and some of the RLC parameters may be used by the UEs and some may be used by the RNC. The RNC thus sets at least one RLC parameter that controls the disposition of a UE to transmit data on the RACH. The value of the at least one RLC parameter is based on the determined resource utilisation of the RACH. Thus if the determined resource utilisation of the RACH is relatively low then the value of the at least one RLC parameter may allow the UEs to send relatively much data in uplink on the RACH and if the determined resource utilisation of the RACH is relatively high then the value of the at least one RLC parameter may allow the UEs to send relatively small amount of data in uplink on the RACH, this will also be described in more detail below. Once the RNC has set the value of the at least one RLC parameter, the RNC employs the at least one RLC parameter to at least one UE being in a CELL_FACH state or entering into the CELL_FACH state. By entering into a state means that the UE transitions from one state to the state that it is entering into. Since only UEs in CELL_FACH state are allowed to send data on the RACH, the RLC parameter that controls the disposition of a UE to transmit data on the RACH is only employed for those UEs.

In this manner, in case the resource utilisation of the RACH is increasing such that there might be a risk of the quality of the RACH deteriorating, the RNC sets the value of the at least one RLC parameter that controls the disposition of a UE to transmit data on the RACH so that it reduces the UE's inclination to send data on the RACH.

The method performed by the RNC may have several advantages. One possible advantage is that by dynamically setting (or changing) the RLC parameters, a possible deterioration of the random access channel may be prevented in high load scenarios, while allowing for high performance in low load scenarios. Since the RACH is sensitive to high load and a well-functioning random access that can handle signalling from UEs to the network is a key component in e.g. ensuring emergency and speech accessibility, it is important that the quality of the RACH is not allowed to deteriorate as the number of UEs in the network (or being connected to the RBS) increases. Meanwhile, the end-user experience for UEs in CELL_FACH state is dependent on the network allowing for as much data transmission as possible on the RACH without creating problems.

The method may further comprise signalling 140 the at least one RLC parameter to at least one UE being in CELL_FACH state or entering into the CELL_FACH state.

The RNC may choose to have the value of the at least one RLC parameter to be valid for all UEs already being in CELL_FACH state or to be valid only for UEs entering into the CELL_FACH state after the RNC has set the value of the at least one RLC parameter. Merely as an example, in case the determined resource utilisation level of the RACH is relatively high causing the RNC to set the value of the RLC parameter to a different value than the value the RLC parameter had before, then this new value may be enforced by the RNC only for UEs entering into the CELL_FACH state but for the UEs already being in CELL_FACH state the value is kept as it was. In other words, the value of the at least one RLC parameter may be set per UE. The RNC may then signal the at least one RLC parameter to those UEs for which is it valid, e.g. to at least one UE being in CELL_FACH state or entering into the CELL_FACH state.

It shall be pointed out that this is merely an embodiment and it may not be compulsory in other embodiments. It is further indicated in FIG. 1 that this is optional by the box 140 being dotted.

The at least one RLC parameter may control the UE disposition to transmit or retransmit a data packet while awaiting acknowledgement on a previously transmitted data packet.

When the UE has transmitted a data packet to the RBS, the RBS may acknowledge receipt of the data packet in case it was successfully received by the RBS, and the RBS may send negatively acknowledge receipt of the data packet otherwise. Generally, if the UE does not receive an acknowledgement or negative acknowledgement within a certain time, the UE may deduce that the packet was lost and retransmit the packet again. Thus, the value of the at least one RLC parameter that is set by the RNC is for an RLC parameter that controls the UE disposition to transmit or retransmit a data packet while awaiting acknowledgement on a previously transmitted data packet. In this manner, in case the resource utilisation of the RACH is becoming relatively high, the RNC may set the value of the RLC parameter that controls the UE disposition to transmit or retransmit a data packet while awaiting acknowledgement on the previously transmitted data packet to a value that makes the UE wait a longer time period before transmitting a new data packet or retransmitting the data packet not yet acknowledged.

The RLC parameters may be set per UE currently being connected to the RNC; and being in CELL_FACH state or entering into the CELL_FACH state.

As described above, the RNC may set the different RLC parameters per UE and thus different UEs may have different values for different RLC parameters. For example, the RNC may set the values for the different RLC parameters per UE currently being connected to the RNC; and being in CELL_FACH state or entering into the CELL_FACH state. Merely as an example, in case the resource utilisation level of the RACH is relatively high so that a possible deterioration of the quality of the RACH may occur, the RNC may set the value for the at least one RLC parameter per UE entering into the CELL_FACH state. In this manner, the UEs already being in CELL_FACH state when the value of the at least one RLC parameter is set (or changed to a more disadvantage value for the UE with regards to the ability to send data on the RACH) keep the old value of the at least one RLC parameter.

Merely as an example, in case the resource utilisation level of the RACH is relatively high but not alarmingly high, then the RNC may set the value of the at least one RLC parameter to be set per UEs currently being connected to the RNC, and entering into the CELL_FACH. However, if the resource utilisation level of the RACH is alarmingly high, then the RNC may set the value of the at least one RLC parameter to be set for all UEs currently being connected to the RNC and being in CELL_FACH state in order to more quickly reduce the resource utilisation level of the RACH. In this manner, a possible deterioration of the quality of the RACH may be avoided.

The at least one RLC parameters may be Timer_Poll or Tx_Window_Size or both the Timer_Poll and the Tx_Window_Size used by the at least one UE.

There are several RLC parameters that may affect the disposition of a UE to transmit data on the RACH. The RLC parameter Timer_Poll, when set for the UE, controls when a data packet is polled again and at the same time retransmitted, in the uplink (on the RACH channel), in case no RLC acknowledgement has been received at timer expiry. Thus a higher value of this parameter makes the UE to wait a longer time before re-transmitting a packet compared to a lower value of this parameter which makes the UE to wait a shorter time before transmitting the packet.

The RLC parameter, Tx_Window_Size, when set for the UE, controls how many outstanding (non-acknowledged) packets the UE may have. Thus a higher value of this parameter makes the UE to transmit more packets without receiving corresponding acknowledgements for the individual packets compared to a lower value of this parameter which makes the UE to transmit fewer packets without receiving corresponding acknowledgements for the individual packets.

As stated above, the RNC may set the value of at least one RLC parameter that controls the disposition of a UE to transmit data on the RACH. Thus the RNC may set more than one, e.g. both the Timer_Poll and the Tx_Window_Size used by the at least one UE.

According to an embodiment, when the resource utilisation level of the RACH goes above a threshold, the value of Timer_Poll is increased and the value of Tx_Window_Size is decreased; and when the resource utilisation level of the RACH falls below the threshold, the value of Timer_Poll is decreased and the value of Tx_Window_Size is increased.

The RNC may monitor the resource utilisation level of the RACH against one or more thresholds. Merely as an example, there may be just one threshold and when the resource utilisation level is above the threshold the resource utilisation level is deemed high and when the resource utilisation level is below the threshold the resource utilisation level is deemed low. In the example above with the resource utilisation level being relatively high or alarmingly high, there may be two thresholds. In an example when the resource utilisation level of the RACH is determined to be e.g. below the threshold at a first time T0 and the resource utilisation level of the RACH is determined to be below the threshold also at a second time T1, then the value of the at least one RLC parameter is set to be the same at time T1 as it was at time T0. The same is valid of the resource utilisation level of the RACH was above the threshold both at T0 and T1. However, if the resource utilisation level of the RACH crosses the threshold between time T0 and T1, then the value of the at least one RLC parameter is changed in order to adapt to the changed circumstances on the RACH. If the resource utilisation level has dropped, then the UEs in CELL_FACH state may be given more opportunity to transmit data on the RACH by decreasing the value of Timer_Poll and increasing the value of Tx_Window_Size. Thus the resources of the RACH are optimised to be used as much as possible.

However, if the resource utilisation level has increased, then the UEs in CELL_FACH state may be given les opportunity to transmit data on the RACH by increasing the value of Timer_Poll and decreasing the value of Tx_Window_Size. Thus avoiding a possible overload situation of the RACH with possible quality deterioration as a consequence.

The value of the at least one RLC parameter may signalled to the at least one UE via inband RLC signalling using a Status Packet Data Unit, PDU.

There are different ways to signal the value of the RLC parameter to the at least one UE. In case of e.g. an increase in resource utilisation of the RACH, it might be desirable to keep signalling to a minimum. However, the UE(s) must be signalled the new values of the parameter(s), especially if the value of parameter(s) reduces the UEs' inclination to send data on the RACH. The PDU is an Open-System Interconnection, OSI, term used in telecommunications that refers to a group of information added or removed by a layer of the OSI model. Each layer in the model uses the PDU to communicate and exchange information, which can only be read by the peer layer on the receiving device and is then handed over to next upper layer after stripping.

The method may further comprise setting at least one of RLC parameters Timer_Poll, and Timer_Status_Prohibit for the RNC; and Timer_Status_Prohibit for the at least one UE based on the determined resource utilisation level of the RACH.

There may be other RLC parameters than those mentioned above that may be advantageous to set based on the determined resource utilisation level. The Timer_Poll for the RNC steers when a data packet is polled again and at the same time retransmitted, in the uplink (on the RACH channel), in case no RLC acknowledgement has been received at timer expiry. The parameter may be increased in order to reduce uplink data retransmissions from UEs. The Timer_Status_Prohibit for the RNC steers how often the RNC is allowed to send RLC status messages. This timer may be increased in order to reduce uplink data transmissions. The Timer_Status_Prohibit for the UE steers how often the UE is allowed to send RLC status messages. This parameter may be increased in order to reduce uplink RLC status reports.

Determining 110 the resource utilisation level of the RACH may comprise measuring a Round Trip Time, RTT, between the RNC and the at least one UE and/or an RTT between the RBS and the at least one UE.

The RTT is the length of time it takes for a signal or packet to be sent plus the length of time it takes for an acknowledgment of that signal or packet to be received. A relatively long RTT may indicate that the resource utilisation is relatively high. Thus, when it becomes higher than a certain threshold, the at least one RLC parameter may be set based on the RTT having crossed the threshold. It may be enough to get an indication of one particular UE's RTT to set the value for the at least one RLC parameter not only this UE's RLC parameter, but also other UEs' RLC parameter, or value(s) of RLC parameter(s) for other UEs. It shall be pointed out that the RTT is measured on the RACH.

Determining 110 the resource utilisation level of the RACH may further and/or alternatively comprise receiving a report from the RBS.

The RBS may measure performance of RACH preamble decoding in the RBS. For example measure the amount of negative acknowledgements sent on the Acquisition Indicator Channel, AICH channel in comparison with how many positive acknowledgements sent on the AICH channel. When performance deteriorates, the RNC is informed e.g. by means of sending a report to the RNC and the RNC may take appropriate actions, e.g. by setting a value of at least one RLC parameter to reduce at least one UE's inclination to send data on the RACH.

Determining 110 the resource utilisation level of the RACH may further and/or alternatively comprise measuring a RACH load in the RNC.

This is another way of monitoring and determining the resource utilisation level of the RACH in the RNC. This may be done e.g. by measuring how much data is received on the RACH compared to how much signalling is received on the RACH.

Determining 110 the resource utilisation level of the RACH may further and/or alternatively comprise measuring the number of UEs being served by the RBS and currently being in CELL_FACH state.

The more UEs being served by the RBS and currently being in CELL_FACH state, the higher the resource utilisation of the RACH may be presumed.

Determining (110) the resource utilisation level of the RACH may further and/or alternatively comprise measuring a FACH load of a downlink FACH channel associated with the uplink RACH channel.

The FACH channel is a downlink channel from the RBS to the UEs being served by the RBS. Thus, in case the FACH is heavily loaded, it might be assumed that the RACH, being an uplink channel, is correspondingly being heavily loaded.

The RLC parameters may set the same for all UEs being in CELL_FACH state or entering CELL_FACH state and being served by the RBS and sharing the RACH.

As described above, the value of the at least one RLC parameter may be set per UE individually or the value may be set the same for all UEs being in CELL_FACH state or entering CELL_FACH state and being served by the RBS and sharing the RACH.

According to an embodiment, wherein when the resource utilisation level of the RACH goes above the threshold at time T, the RLC parameter(s) are set to a new second value for all UEs which subsequently, after time T, becomes served by the RBS and entering CELL_FACH state and sharing the RACH, wherein the value of the RLC parameter(s) for the UEs already being in CELL_FACH state before time T keep the value of the at least one RLC parameter as it was set before time T occurred.

This has also been described above. Merely as an example, in case the resource utilisation level of the RACH is relatively high but not alarmingly high, then the RNC may set the value of the at least one RLC parameter to be set per UEs currently being connected to the RNC, and entering into the CELL_FACH. Thus, all UEs currently being connected to the RNC and already being in CELL_FACH state at time T keep the value of the at least one RLC parameter as it was set before time T occurred.

Embodiments herein also relate to an RNC 200 adapted for managing the utilisation of a RACH of a WCDMA communication network, the RNC being associated with an RBS, wherein the RACH is an uplink channel between UEs and the RBS. The RNC has the same objects, technical features and advantages as the method performed by the RNC. The RNC will only be described in brief in order to avoid unnecessary repetition, with reference to FIG. 2.

Figure 2:
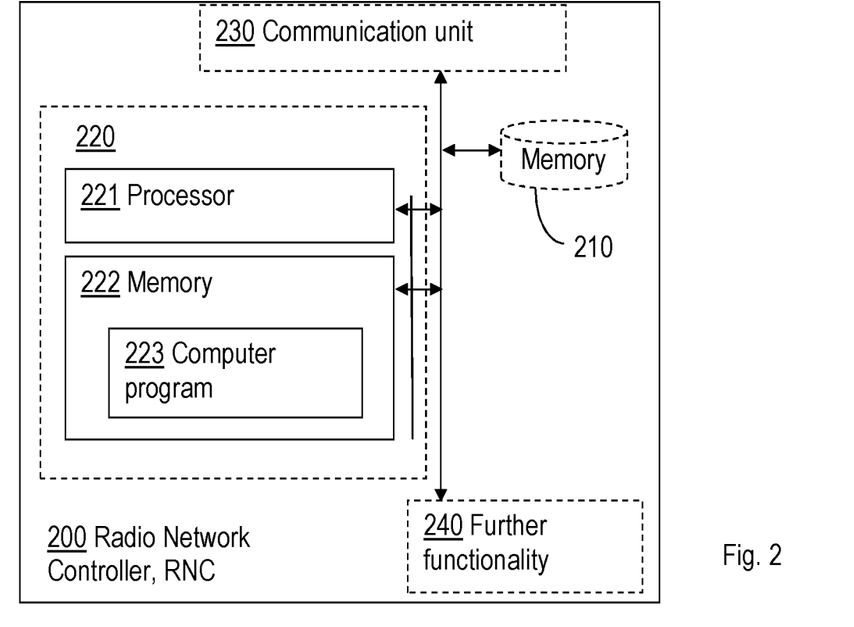
FIG. 2 is a block diagram of an RNC adapted for managing the utilisation of a RACH of a WCDMA communication network according to an exemplifying embodiment.

FIG. 2 is a block diagram of an RNC adapted for managing the utilisation of a RACH of a WCDMA communication network according to an exemplifying embodiment.

FIG. 2 illustrates the RNC 200 comprising a processor 221 and a memory 222, the memory comprising instructions which when executed by the processor causes the RNC 200 to determine a current resource utilisation level of the RACH; to set based on the determined resource utilisation, a value of at least one RLC parameter that controls the disposition of a UE to transmit data on the RACH; and to employ the at least one RLC parameter to at least one UE being in a CELL_FACH state or entering into the CELL_FACH state.

The RNC has the same possible advantages as the method performed by the RNC. One possible advantage is that by dynamically setting (or changing) the RLC parameters, a possible deterioration of the random access channel may be prevented in high load scenarios, while allowing for high performance in low load scenarios. Since the RACH is sensitive to high load and a well-functioning random access that can handle signalling from UEs to the network is a key component in e.g. ensuring emergency and speech accessibility, it is important that the quality of the RACH is not allowed to deteriorate as the number of UEs in the network (or being connected to the RBS) increases. Meanwhile, the end-user experience for UEs in CELL_FACH state is dependent on the network allowing for as much data transmission as possible on the RACH without creating problems.

The memory 222 may further comprise instructions which when executed by the processor causes the RNC 200 to signal the at least one RLC parameter to at least one UE being in a Cell Forward Access Channel, CELL_FACH, state or entering into the CELL_FACH state.

According to an embodiment, the at least one RLC parameter controls the UE disposition to transmit or retransmit a data packet while awaiting acknowledgement on a previously transmitted data packet.

According to still an embodiment, the RLC parameters are set per UE currently being connected to the RNC; and being in CELL_FACH state or entering into the CELL_FACH state.

According to still an embodiment, the at least one RLC parameters is Timer_Poll or Tx_Window_Size or both the Timer_Poll and the Tx_Window_Size used by the at least one UE.

According to another embodiment, when the resource utilisation level of the RACH goes above a threshold, the value of Timer_Poll is increased and the value of Tx_Window_Size is decreased; and when the resource utilisation level of the RACH falls below the threshold, the value of Timer_Poll is decreased and the value of Tx_Window_Size is increased.

The memory 222 may further comprise instructions which when executed by the processor causes the RNC 200 to signal the parameter to the at least one UE via inband RLC signalling using a Status Packet Data Unit, PDU.

The memory 222 may still further comprise instructions which when executed by the processor causes the RNC 200 to set at least one of RLC parameters Timer_Poll, and Timer_Status_Prohibit for the RNC; and Timer_Status_Prohibit for the at least one UE based on the determined resource utilisation level of the RACH.

Determining the resource utilisation level of the RACH may comprise measuring an RTT between the RNC and the at least one UE and/or an RTT between the RBS and the at least one UE.

Determining the resource utilisation level of the RACH may comprise receiving a report from the RBS.

Determining the resource utilisation level of the RACH may comprise measuring a RACH load in the RNC.

Determining the resource utilisation level of the RACH may comprise measuring the number of UEs being served by the RBS and currently being in CELL_FACH state.

Determining the resource utilisation level of the RACH may comprise measuring a FACH load of a downlink FACH channel associated with the uplink RACH channel.

According to an embodiment, the RLC parameters are set the same for all UEs being in CELL_FACH state or entering CELL_FACH state and being served by the RBS and sharing the RACH.

According to yet an embodiment, when the resource utilisation level of the RACH goes above the threshold at time T, the RLC parameter(s) are set to a new second value for all UEs which subsequently, after time T, becomes served by the RBS and entering CELL_FACH state and sharing the RACH, wherein the value of the RLC parameter(s) for the UEs already being in CELL_FACH state before time T keep the value of the at least one RLC parameter as it was set before time T occurred.

Embodiments herein also relate to an RNC 200 for managing the utilisation of a RACH of a WCDMA communication network, the RNC being associated with an RBS, wherein the RACH is an uplink channel between UEs and the RBS. The RNC has the same objects, technical features and advantages as the method performed by the RNC and the RNC described above with reference to FIG. 2. The RNC will only be described in brief in order to avoid unnecessary repetition, with reference to FIG. 3.

Figure 3:
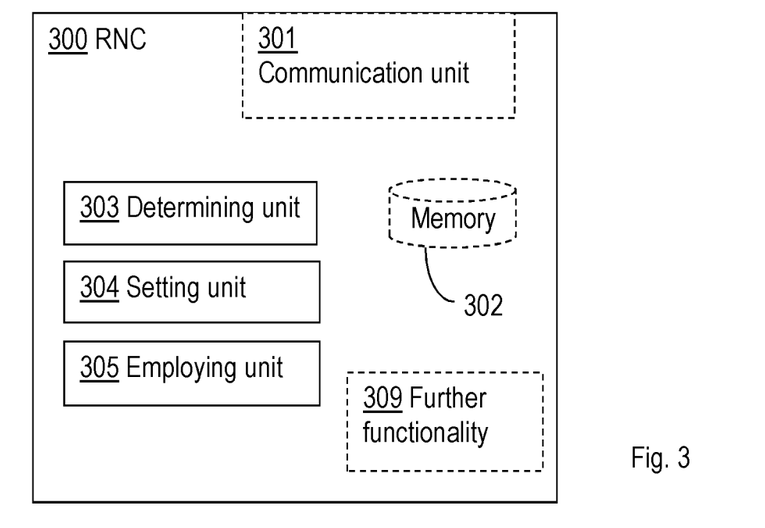
FIG. 3 is a block diagram of an RNC for managing the utilisation of a RACH of a WCDMA communication network according to an exemplifying embodiment.

FIG. 3 is a block diagram of an RNC for managing the utilisation of a RACH of a WCDMA communication network according to an exemplifying embodiment.

FIG. 3 illustrates the RNC 200 comprising a determining unit 303 for determining a current resource utilisation level of the RACH; a setting unit 304 for setting based on the determined resource utilisation, a value of at least one Radio Link Control, RLC, parameter that controls the disposition of a UE to transmit data on the RACH; and an employing unit 305 for employing the at least one RLC parameter to at least one UE being in a Cell Forward Access Channel, CELL_FACH, state or entering into the CELL_FACH state The RNC has the same possible advantages as the method performed by the RNC and the RNC described above with reference to FIG. 2. One possible advantage is that by dynamically setting (or changing) the RLC parameters, a possible deterioration of the random access channel may be prevented in high load scenarios, while allowing for high performance in low load scenarios. Since the RACH is sensitive to high load and a well-functioning random access that can handle signalling from UEs to the network is a key component in e.g. ensuring emergency and speech accessibility, it is important that the quality of the RACH is not allowed to deteriorate as the number of UEs in the network (or being connected to the RBS) increases. Meanwhile, the end-user experience for UEs in CELL_FACH state is dependent on the network allowing for as much data transmission as possible on the RACH without creating problems.

In FIG. 3, the network node 300 is also illustrated comprising a communication unit 301. Through this unit, the RNC 300 is adapted to communicate with other nodes and/or entities in the wireless communication network. The communication unit 301 may comprise more than one receiving arrangement. For example, the communication unit 301 may be connected to both a wire and an antenna, by means of which the RNC 300 is enabled to communicate with other nodes and/or entities in the wireless communication network. Similarly, the communication unit 301 may comprise more than one transmitting arrangement, which in turn are connected to both a wire and an antenna, by means of which the RNC 300 is enabled to communicate with other nodes and/or entities in the wireless communication network. The RNC 300 further comprises a memory 302 for storing data. Further, the network node 300 may comprise a control or processing unit (not shown) which in turn is connected to the different units 303-305. It shall be pointed out that this is merely an illustrative example and the RNC 300 may comprise more, less or other units or modules which execute the functions of the RNC.

It should be noted that FIG. 3 merely illustrates various functional units in the RNC 300 in a logical sense. The functions in practice may be implemented using any suitable software and hardware means/circuits etc. Thus, the embodiments are generally not limited to the shown structures of the RNC 300 and the functional units. Hence, the previously described exemplary embodiments may be realised in many ways. For example, one embodiment includes a computer-readable medium having instructions stored thereon that are executable by the control or processing unit for executing the method steps in the network node 300. The instructions executable by the computing system and stored on the computer-readable medium perform the method steps of the network node 300 as set forth in the claims.

Figure 4:
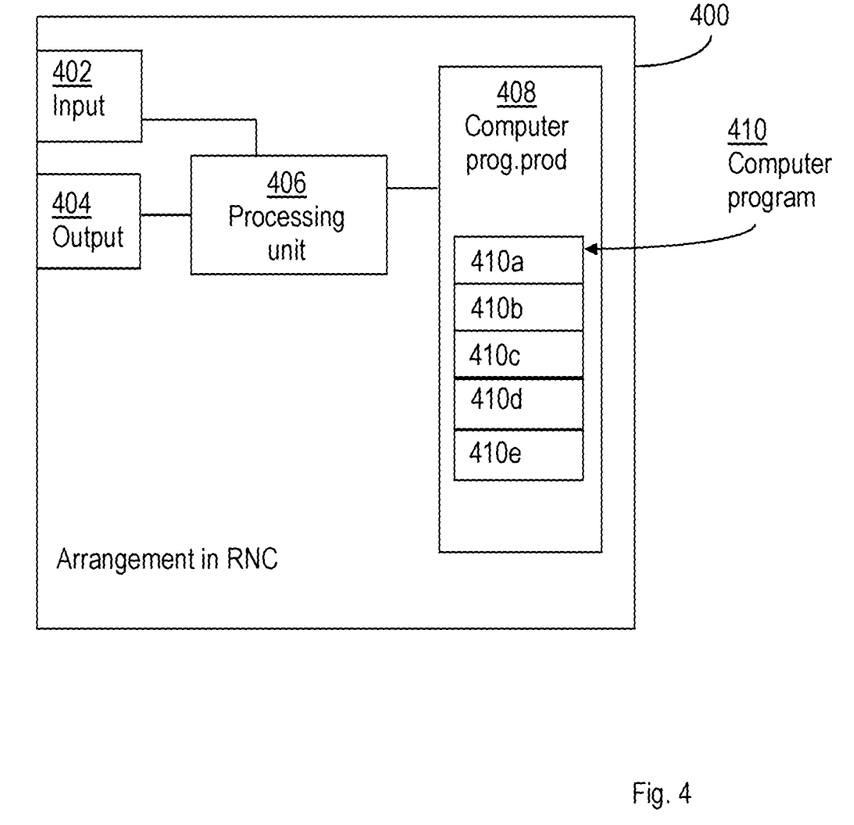
FIG. 4 is a block diagram of an arrangement in an RNC for managing the utilisation of a RACH of a WCDMA communication network according to an exemplifying embodiment.

FIG. 4 schematically shows an embodiment of an arrangement in a RNC 400. Comprised in the arrangement in the RNC 400 are here a processing unit 406, e.g. with a DSP (Digital Signal Processor). The processing unit 406 may be a single unit or a plurality of units to perform different actions of procedures described herein. The arrangement in the RNC 400 may also comprise an input unit 402 for receiving signals from other entities, and an output unit 404 for providing signal(s) to other entities. The input unit and the output unit may be arranged as an integrated entity as illustrated in the example of FIG. 3 and the communication unit 301.

Furthermore, the arrangement in the RNC 400 comprises at least one computer program product 408 in the form of a non-volatile memory, e.g. an EEPROM (Electrically Erasable Programmable Read-Only Memory), a flash memory and a hard drive. The computer program product 408 comprises a computer program 410, which comprises code means, which when executed in the processing unit 406 in the arrangement in the RNC 400 causes the network node to perform the actions e.g. of the procedure described earlier in conjunction with FIG. 1.

The computer program 410 may be configured as a computer program code structured in computer program modules 410a-410e. Hence, in an exemplifying embodiment, the code means in the computer program of the arrangement in the RNC 400 comprises a determining unit, or module, for determining a current resource utilization level of the RACH. The computer program further comprises a setting unit, or module, for setting, based on the determined resource utilisation, a value of at least one RLC parameter that controls the disposition of a UE to transmit data on the RACH. Still further, the computer program comprises an employing unit for employing the at least one RLC parameter to at least one UE being in the CELL_FACH state or entering_into the CELL_FACH state.

The computer program modules could essentially perform the actions of the flow illustrated in FIG. 1, to emulate the network node 300. In other words, when the different computer program modules are executed in the processing unit 406, they may correspond to the units 303-305 of FIG. 3.

Although the code means in the respective embodiments disclosed above in conjunction with FIG. 3 may be implemented as computer program modules which when executed in the respective processing unit causes the RNC to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the RNC.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a Radio Network Controller, RNC, for managing the utilisation of a Random Access Channel, RACH, of a Wideband Code Division Multiple Access, WCDMA, communication network, the RNC being associated with a Radio Base Station, RBS, wherein the RACH is an uplink channel between User Equipments, UEs, and the RBS, the method comprising:
   determining a current resource utilisation level of the RACH;
   setting, based on the determined resource utilisation, a value of at least one Radio Link Control, RLC, parameter that controls the disposition of a UE in a Cell Forward Access Channel, CELL FACH, state to transmit or retransmit a data packet on the RACH while awaiting acknowledgement on a previously transmitted data packet on the RACH; and
   employing the at least one RLC parameter to at least one UE being in the Cell Forward Access Channel, CELL_FACH, state.

2. The method according to claim 1, further comprising signalling the at least one RLC parameter to at least one UE being in the Cell Forward Access Channel, CELL_FACH, state.

3. The method according to claim 2, wherein the RLC parameters are signalled to the at least one UE via inband RLC signalling using a Status Packet Data Unit, PDU.

4. The method according to claim 2, further comprising setting at least one of RLC parameters Timer_Poll, and Timer_Status_Prohibit for the RNC; and Timer_Status_Prohibit for the at least one UE based on the determined resource utilisation level of the RACH.

5. The method according to claim 1, wherein the RLC parameters are set per UE currently being connected to the RNC; and being in CELL_FACH state.

6. The method according to claim 1, wherein the at least one RLC parameters is Timer_Poll or Tx_Window_Size or both the Timer_Poll and the Tx_Window_Size used by the at least one UE.

7. The method according to claim 6, wherein when the resource utilisation level of the RACH goes above a threshold, the value of Timer_Poll is increased and the value of Tx_Window_Size is decreased; and when the resource utilisation level of the RACH falls below the threshold, the value of Timer_Poll is decreased and the value of Tx_Window_Size is increased.

8. The method according to claim 1, wherein determining the resource utilisation level of the RACH comprises measuring a Round Trip Time, RTT, between the RNC and the at least one UE and/or an RTT between the RBS and the at least one UE.

9. A Radio Network Controller, RNC, adapted for managing the utilisation of a Random Access Channel, RACH, of a Wideband Code Division Multiple Access, WCDMA, communication network, the RNC being associated with a Radio Base Station, RBS, wherein the RACH is an uplink channel between User Equipments, UEs, and the RBS, the RNC comprising:
   a processor; and
   a memory, the memory comprising instructions which when executed by the processor causes the RNC to:
   determine a current resource utilisation level of the RACH;
   set based on the determined resource utilisation, a value of at least one Radio Link Control, RLC, parameter that controls the disposition of a UE in a Cell Forward Access Channel, CELL FACH, state to transmit or retransmit a data on the RACH while awaiting acknowledgement on a previously transmitted data packet on the RACH; and
   employ the at least one RLC parameter to at least one UE being in the Cell Forward Access Channel, CELL_FACH, state.

10. The RNC according to claim 9, the memory further comprising instructions which when executed by the processor causes the RNC to signal the at least one RLC parameter to at least one UE being in the Cell Forward Access Channel, CELL_FACH, state.

11. The RNC according to claim 10, wherein the memory further comprises instructions which when executed by the processor causes the RNC to signal the parameter to the at least one UE via inband RLC signalling using a Status Packet Data Unit, PDU.

12. The RNC according to claim 10, wherein the memory further comprises instructions which when executed by the processor causes the RNC to set at least one of RLC parameters Timer_Poll, and Timer_Status_Prohibit for the RNC; and Timer_Status_Prohibit for the at least one UE based on the determined resource utilisation level of the RACH.

13. The RNC according to claim 9, wherein the RLC parameters are set per UE currently being connected to the RNC; and being in CELL_FACH state.

14. The RNC according to claim 9, wherein the at least one RLC parameters is Timer_Poll or Tx_Window_Size or both the Timer_Poll and the Tx_Window_Size used by the at least one UE.

15. The RNC according to claim 14, wherein when the resource utilisation level of the RACH goes above a threshold, the value of Timer_Poll is increased and the value of Tx_Window_Size is decreased; and when the resource utilisation level of the RACH falls below the threshold, the value of Timer_Poll is decreased and the value of Tx_Window_Size is increased.

16. A Radio Network Controller, RNC, for managing the utilisation of a Random Access Channel, RACH, of a Wideband Code Division Multiple Access, WCDMA, communication network, the RNC being associated with a Radio Base Station, RBS, wherein the RACH is an uplink channel between User Equipments, UEs, and the RBS, the RBS comprising:
   a determining unit for determining a current resource utilisation level of the RACH,
   a setting unit for setting, based on the determined resource utilisation, a value of at least one Radio Link Control, RLC, parameter that controls the disposition of a UE in a Cell Forward Access Channel, CELL FACH, state to transmit or retransmit a data packet on the RACH while awaiting acknowledgement on a previously transmitted data packet on the RACH, and
   an employing unit for employing the at least one RLC parameter to at least one UE being in the Cell Forward Access Channel, CELL_FACH, state.

17. A computer readable medium containing computer readable code means, which when run in a processing unit comprised in an arrangement in a Radio Network Controller, RNC, causes the RNC to perform a method comprising:
   determining a current resource utilisation level of a Random Access Channel, RACH, of a Wideband Code Division Multiple Access, WCDMA, communication network, wherein the RACH is an uplink channel between User Equipments, UEs, and, a Radio Base Station, RBS, associated with the RNC;
   setting, based on the determined resource utilisation, a value of at least one Radio Link Control, RLC, parameter that controls the disposition of a UE in a Cell Forward Access Channel, CELL FACH, state to transmit or retransmit a data packet on the RACH while awaiting acknowledgement on a previously transmitted data packet on the RACH; and
   employing the at least one RLC parameter to at least one UE being in the Cell Forward Access Channel, CELL_FACH, state.

* * * * *